J. CROWE.
MECHANICAL DRIVE BELT.
APPLICATION FILED MAY 1, 1916.

1,194,962.

Patented Aug. 15, 1916.

WITNESSES:
E. M. Callaghan
Alan F. James.

INVENTOR
JOHN CROWE,
BY
Munn & Co.
ATTORNEYS

UNITED STATES PATENT OFFICE.

JOHN CROWE, OF ST. JOSEPH, MISSOURI, ASSIGNOR TO ANISER MANUFACTURING COMPANY, OF ST. JOSEPH, MISSOURI, A CORPORATION OF MISSOURI.

MECHANICAL DRIVE-BELT.

1,194,962.   Specification of Letters Patent.   Patented Aug. 15, 1916.

Application filed May 1, 1916. Serial No. 94,718.

*To all whom it may concern:*

Be it known that I, JOHN CROWE, a citizen of the United States, and a resident of St. Joseph, in the county of Buchanan and State of Missouri, have invented a certain new and useful Improvement in Mechanical Drive-Belts, of which the following is a specification.

One of the principal objects of my invention is to provide an improved drive belt, on the alternate links of which, traction blocks for engagement with the pulleys are mounted, the blocks being made to conform in shape with the crown of the pulley.

Another object of the invention is to provide an improved belt of the class described, in which a degree of elasticity, to compensate for wear which may occur in the belt, is provided for.

Still another object of my invention is to provide an improved belt of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1:
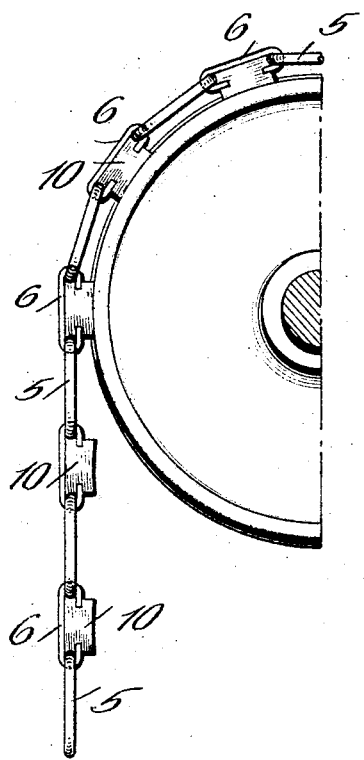
Figure 2:
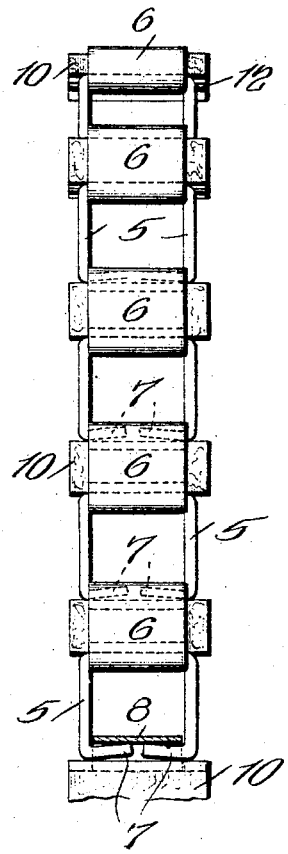
Figure 3:
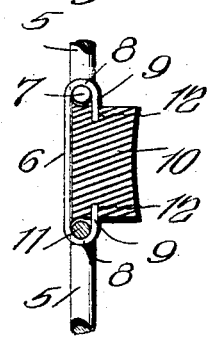
Figure 4:
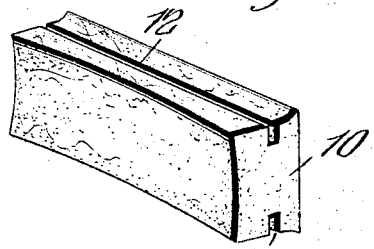

Figure 1 represents a view in edge elevation of a portion of a belt constructed according to my invention. Fig. 2 represents a plan view thereof. Fig. 3 represents a view in section taken longitudinally through a section of the belt. Fig. 4 represents a view in perspective of one of the traction blocks removed.

In carrying out my invention, I provide a belt consisting of the open links and intermediate closed links 6. The links 5 are each made of a length of suitable wire bent into a rectangular shape, with the ends 7 of the wire together forming one of the sides of the link. It is of course to be understood that various shapes may be assumed by the links 5 without departing from the spirit of the invention, the rectangular shape shown being merely illustrative of the invention.

The links 6 are each formed of a length or strip of metal having its ends overturned around opposing sides of adjacent links 5, as at 8, and then returned into substantially parallel relation with the body portion of the link 6 at its extremities, as at 9.

The links 6 serve as means for anchoring the traction block 10 upon the belt. One of the blocks is carried by each link 6, being positioned, as indicated in Fig. 3, against the link between the adjacent bars of links 5, and being retained in place by reason of the ends 9 of link 6 being buried in the lateral edges of the block. The blocks may be provided on their longer sides, if desired, with slots 12 into which the ends 9 of the links 6 may engage, said slots assisting the blocks in being put into place, it being understood that the blocks may be driven lengthwise between the overturned portions 9 of the links 6. It is preferable to form the blocks with their bearing surfaces concaved longitudinally and transversely of the belt to conform with the curvature respectively of the periphery of the pulley and the crown thereof. The blocks, it will be noted, extend at their ends beyond the lateral edges of the links, so as to prevent contact of the latter with the flanges of the pulleys when the belt is used with flanged pulleys whereby the double advantage of the elimination of noise and the reduction of friction is attained. Though it is preferable to form the traction blocks of leather, it is to be understood that other suitable materials may be employed if desirable.

The construction of the belt, as hereinafter set out, makes provision for a degree of elasticity, whereby compensation for wear is acquired. The end portions 7 of the open links 5, it will be noted, are returned in convergent relation to each other, toward the side of the links opposite the one which they form. These end portions thus form resilient arms which normally tend to draw the links 6 toward each other, and when the belt is placed in position upon the pulleys and is slightly stretched, it will be seen that any wear which occurs in the traction blocks and between the links will be taken up by the tightening of the belt.

The belt which I have provided, while extremely simple in construction, is most efficient in operation, and acts with a minimum degree of noise and friction.

Although I have described the preferred embodiment of my invention, I may desire to make such changes in the construction, combination, and arrangement of parts thereof, as do not depart from the spirit of the invention, and the scope of the appended claims.

I claim:—

1. A belt comprising a plurality of links each formed of a length of wire bent to rectangular shape, intermediate links connecting the first mentioned links and formed of strips of metal having their ends turned over the opposed sides of adjacent of said first links, and leather blocks placed one against each of the intermediate links, the ends of the last said links being buried in the blocks whereby to anchor the latter in position.

2. A belt comprising a plurality of links, alternate links being formed of strips of metal having their ends turned over and returned toward each other, and traction blocks placed against the alternate links, the ends of said alternate links being buried in the traction blocks, for anchoring the latter in place.

3. A flexible belt comprising a plurality of links, alternate links having their end portions turned over and returned toward each other, and blocks engaged each by the end portions of one of the alternate links.

4. A flexible belt having a plurality of alternating open and closed links and traction blocks carried by the closed links and extending at their ends beyond the lateral edges of the belt.

5. A belt comprising a plurality of links formed of wire lengths, the ends of the lengths being turned inward in convergent relation, intermediate links connecting the first mentioned links and formed of strips of metal having their ends turned over the opposite sides of the adjacent of said first links in such manner that the inturned ends of the first mentioned links are engaged by the intermediate links whereby elasticity is imparted to the belt.

6. A belt comprising a plurality of interengaging links, and traction blocks anchored on certain of the links, said traction blocks being concaved longitudinally and transversely whereby to conform with the curvature of the crown and of the periphery respectively of a pulley.

7. A flexible belt comprising a plurality of alternating open and closed links, and traction blocks spaced from one another and extending transversely of the belt with their ends projecting beyond the lateral edges of the belt, said closed links having their ends bent around portions of the said open links and into engagement with the said traction blocks.

JOHN CROWE.